Nov. 28, 1933.  E. L. FONSECA  1,937,058
THERMOSTAT FOR ELECTRIC HEATERS
Filed Feb. 17, 1930
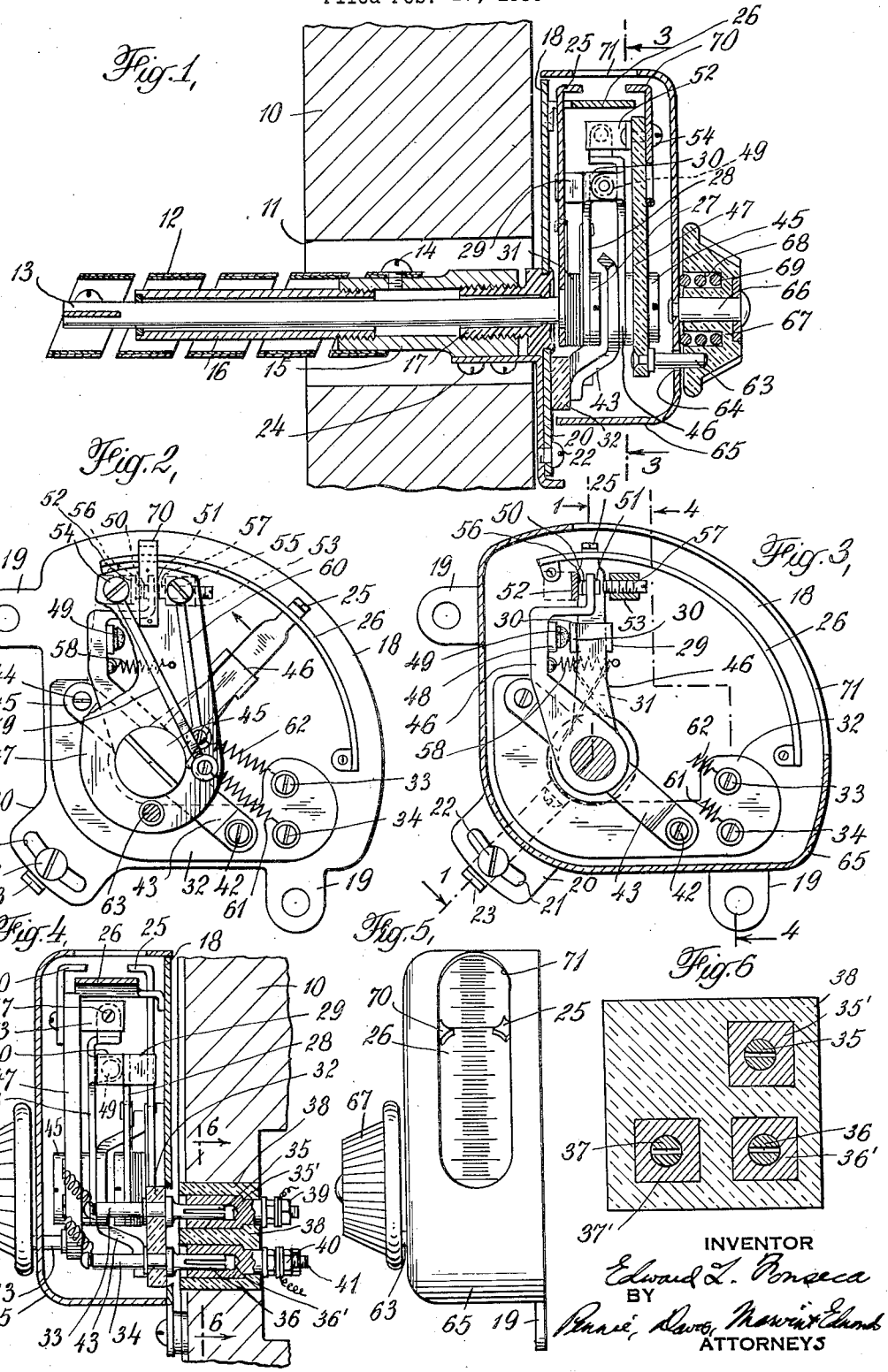

Patented Nov. 28, 1933

1,937,058

UNITED STATES PATENT OFFICE 1,937,058

THERMOSTAT FOR ELECTRIC HEATERS

Edward L. Fonseca, Newark, N. J., assignor to The Wilcolator Company, Newark, N. J., a corporation of Delaware Application February 17, 1930. Serial No. 429,083

3 Claims. (Cl. 200—139)

This invention relates to thermostatic devices for controlling the heating of electric ovens and the like and has particular reference to a thermostatic device for controlling a three-point switch, whereby one circuit is closed when the oven is below the desired temperature and a second circuit is closed when the desired oven temperature is reached.

The principal object of this invention is to provide a thermostatically controlled electric switch of the type described which may be readily mounted on or dismounted from an electric oven of the conventional type in the form of a single unit which is simple in construction and operation, and is not likely to get out of order during long periods of use.

A further object of the invention is to provide a thermostatic electric switch of the type described which may be readily calibrated in place on the oven or other heater, both by the cool check method and while hot without disconnecting any of the parts and without the liability of electrical shock to the person calibrating the device. This calibration is not disturbed in any way while mounting the device upon the oven or the like or when the cover plate is removed for inspection or repair.

These and other objects are obtained in a preferred embodiment of the invention which includes a thermostatic element of the helical strip type connected to a temperature indicating pointer, which moves over a scale and designates the temperature of the oven in which the thermostatic element is inserted. A three-point switch, which is held normally closed in one position to maintain the electrical current through the electrical heating element adapted to heat the oven, is controlled by this pointer to vary the heating effect of the heating element in accordance with a predetermined temperature preregistered upon the device by the user. This predetermined oven temperature is registered by the user by means of a knob controlling a second pointer which is adjustable in position relatively to the thermostatically controlled pointer and cooperates with the same scale with which the thermostatically controlled pointer cooperates. With this arrangement, the thermostatically controlled pointer tends to coincide with the position of the electrical switch pointer as the oven is heated to the temperature preregistered on the scale and as it moves to this position, the thermostatically controlled pointer operates the switch to break the normal circuit through the electrical oven heating element and closes a circuit which maintains the oven at the temperature which was preregistered by means of the manual pointer. The thermostatic element may be calibrated either by the cold check or hot check method by adjusting the position of a lever positioned on the device outside of the oven, the adjustment of this lever not interfering in any way with the particular setting of the device and does not require the disassembly of any part of the device.

For a better understanding of the invention, reference is made to the accompanying drawing, in which Figure 1 is an axial section of the thermostatic control device of this invention as seen along line 1—1 of Fig. 3, when the device is mounted upon an electric oven or other heater;

Fig. 2 is a face view of the device with the cover plate removed;

Fig. 3 is a vertical cross-section of the device as seen along the line 3—3 of Fig. 1;

Fig. 4 is a cross-section of the device as seen along the line 4—4 of Fig. 3;

Fig. 5 is a side view of the device as it appears on the side of an oven; and

Fig. 6 is an enlarged cross-section taken along the line 6—6 of Fig. 4.

In the drawing, numeral 10 designates the wall of the oven of an electric range, for example, this wall having an opening 11 through which is inserted the thermostatic element 12, which is in the form of a spiral strip as seen in Fig. 1. One end of the thermostatic strip 12 is secured in a slot in the end of a low-expanding rotatable rod 13 of Monel metal or the like, and the other end thereof is secured by means of a screw 14 to the outer surface of relatively stationary extension coupling 15 which carries a sleeve 16 for rotatably supporting the free end of rod 13, as shown in Fig. 1. Coupling 15 is movably threaded upon a bushing 17 riveted in the frame 18, which is a flat sheet metal plate provided with at least two projecting ears 19, by means of which the frame 18 and the enumerated parts carried thereby are mounted on the outer surface of the wall of the oven 10. Frame 18 is provided with an extension 20 having a curved slot 21 in which is mounted an adjusting screw 22 threaded into a lever 23, which is secured by screws 24 to the outer surface of coupling 15. Movement of lever 23 when adjusting screw 22 is loosened causes rotation of coupling 15 upon the threaded bushing 17. Rotation of coupling 15, which carries one end of the thermostatic strip 12, causes an adjustment of the thermostatic strip 12, for the reason that such adjustment produces a change in the relative position of the end of thermostatic strip 12 mounted upon extension 15 with respect to the position of the other end of the thermostatic strip 12, which is secured to rod 13 as shown in Fig. 1.

The rod 13 is journalled in bushing 17 and its outer end carries the pointer 25, which is adapted to move in an arc over the scale 26 mounted upon frame 18. This scale 26 is graduated to indicate the various temperatures through the range of which the oven operates, such as from 250° F. to 550° F. In addition to these temperature graduations, the dial may bear the usual inscriptions designating the heat at which various articles of food are to be cooked, baked, roasted or otherwise heat treated in the oven 10. It will be seen that the position of pointer 25 is controlled by the thermostatic strip 12, as this strip twists and untwists to rotate shaft 13, which carries pointer 25.

Mounted upon pointer 25 is a screw bushing 27, upon which is journalled the arm 28, this arm having two oppositely directed lugs at its free end, the lug 29 being adapted to normally engage the right-hand edge of pointer 25, as seen in Figs. 2 and 3, and the lug 30 extending in the opposite direction for performing a function to be described later. Lug 29 is constrained into normal engagement with pointer 25 by means of a torsion spring 31 coiled about bushing 27, whereby arm 28 and pointer 25 lie in coincidence at all times and in all positions of pointer 25.

Secured to the outer surface of frame 18 is an L-shaped plate 32 of insulating material, such as hard rubber, a phenolic resin or the like. Passing through this insulating plate 32 and secured thereon are long binding posts 33 and 34 having connector plugs 35 and 36, respectively, and a binding screw 42 which has a similar connector plug 37 shown in Fig. 6, these connector plugs projecting through the frame 18. These connector plugs 35, 36 and 37 are adapted to seat in sockets 35′, 36′ and 37′ respectively, which are mounted in an insulating bushing 38 secured in the wall of the oven 10 as shown in Figs. 4 and 6. Connector socket members 35′, 36′ and 37′ are square in cross-section and carry electrical binding posts 39, 40 and 41, respectively, which are located in a recess in the inner surface of the oven wall 10, and to which are connected the wires passed through the space between the wall 10 and oven lining not shown, and leading to the oven heating elements and supply lines. The binding screw 42 also serves as an anchor for one end of the U-shaped yoke 43 secured at its opposite end to the insulating plate 32 by means of screw 44.

Mounted upon yoke 43 and aligned axially with screw bushing 27 and shaft 13 is a stud 45, upon which is journalled the electrical contact arm 46 and the radial insulating plate 47. The electrical contact arm 46 has a lateral projection 48, upon which is mounted an insulating button 49, adapted to be engaged by the lug 30 of arm 28. The free end of contact arm 46 carries contacts 50 and 51 on its opposite surfaces.

Insulating plate 47 at its free end carries a pointer 70 adapted to cooperate with scale 26 and two lateral lugs 52 and 53, which are secured in place by screws 54 and 55, respectively. Lug 52 carries a contact 56 adapted to engage with contact 50 of contact arm 46, while lugs 53 is threaded and carries adjustable screw contact 57 adapted to engage contact 51 of contact arm 46, as shown particularly in Figs. 2 and 3. Contacts 51 and 57 are normally held in engagement with each other by means of a coiled spring 58 secured at one end to contact arm 46, and at the other end to the insulating plate 47. Contact screws 54 and 55, which are individual to contacts 56 and 57, respectively, are connected to and secure one end of bus-bars 59 and 60, respectively, which are mounted upon the upper surface of insulating plate 47 as shown in Fig. 2. Bus-bar 59 is bowed at its lower end to clear the lower end of the other bus-bar 60, and their lower ends are spaced apart so that there is no liability of short-circuiting in any position of plate 47 upon which these bus-bars are mounted. Connecting bus-bar 59 with binding post 34 is a connecting wire 61, which is preferably coiled so as to remain taut at all times, and a similar connecting wire 62 connects bus-bar 60 with binding post 33.

Projecting outwardly from the lower end of insulating plate 47 is a pin 63, which passes through a curved slot 64 in the outer surface of cover plate 65, which is mounted upon frame 18 by a friction fit or by suitable positive fastening means, not shown. Journalled upon a stud 66 projecting from the outer surface of cover 65, is a knurled knob 67 having an annular recess 68 in which is mounted the coil spring 69, which frictionally holds knob 67 in whatever position it may be moved. The pin 63 mounted upon an insulating plate 47 is seated in knob 67 so that rotation of knob 67 causes a corresponding rotation of insulating plate 47 about the stud 45 as an axis, the extent of this rotation being designated by pointer 70, which is visible, together with thermostat pointer 25, through the slot 71 in the side of cover 65.

In operation, assuming that the user wishes the oven to be heated to, say 550°, she grasps knob 67 and rotates it in a counter-clockwise direction until pointer 70 carried by insulating plate 47 designates the inscription 550° upon scale 26. At this time contacts 51 and 57 are in engagement because of the tension of spring 58, which draws these contacts together. The current traverses the wire connected to binding post 41, separable connector 37—37′, binding post 42, yoke 43, bushing 45, contact arm 46, contact 51, contact 57, lug 53, screw 55, bus-bar 60, wire 62, binding post 33, separable connector 35—35′, binding post 39, and the wire connected thereto. The user then turns on the electrical switch, not shown, which starts the oven into operation, or this may be done before the thermostat is set.

As the oven heats up, thermostatic strip 12, in response to the heat of the oven, twists to rotate shaft 13 carrying pointer 25, so that pointer 25 moves in a counter-clockwise direction over scale 26 toward stationary pointer 70 located opposite the temperature at which the oven is to be maintained, the pointer 25 carrying with it the arm 28 because of the lug 29 connection between the latter and the pointer 25. Just before pointer 25 reaches a position coincident with the position of pointer 70, lug 30 of arm 28 engages insulating button 49 of contact arm 46 to move the latter in a counter-clockwise direction against the tension of spring 58. This movement of contact arm 46 causes the connection between contacts 51 and 57 to be broken, and makes connection between contacts 50 and 56, thereby completing another circuit traceable from binding post 41, separable connector 37—37′, binding post 42, yoke 43, stud 45, contact arm 46, contact 50, contact 56, lug 52, screw 54, bus-bar 59, wire 61, binding post 34, separable connector 36—36', and binding post 40 to the other elements of the circuit, which may include any well known form of apparatus intended to control the main circuit which supplies the electricity to the heating elements of the device, but such apparatus and the particular manner in which it is connected form no part of the present inventioin and therefore need not be further discussed.

When the user turns off the heating current so that the oven cools down, thermostatic strip 12 twists in the opposite direction to move pointer 25 in a clockwise direction, whereby the connection between contacts 50 and 56 is broken and the connection between contacts 51 and 57 is re-made, so that the electrical circuit is prepared for the next heating operation. As the oven cools further, pointer 25 moves further down the scale 26, carrying arm 28 with it until the oven is cold, when the pointer 25 assumes a position of rest. It will be seen that the return movement of pointer 25 when the oven is cooling down does not interfere in any way with the setting of pointer 70, so that if the user wishes to use the oven a number of times at the same temperature, she is not required to set the device each time the oven is to be used.

Should the user desire to set the device at a lower temperature while the oven is hot, she may do so merely by rotating the knob 67 in a clockwise direction until pointer 70 designates the desired oven temperature. As the oven is still hot, the thermostatically controlled pointer remains in a substantially vertical position, while the movement of the radial insulating plate 47 by the knob 67 carries arm 28 away from its normal position coincident with pointer 25 because of the engagement of the button 49 on contact arm 46 with the lug 30 of arm 28. This engagement of button 49 with lug 30 of arm 28 causes contacts 50 and 56 to remain engaged or to engage, if not engaged, at the time that knob 17 is turned so that the oven cools down until thermostatically controlled pointer 25 again engages lug 29 on arm 28 to allow spring 58 to reconnect normally engaged contacts 51 and 57 to cause the re-heating of the oven to maintain the temperature designated by pointer 70 on scale 26.

Inasmuch as thermostatically controlled pointer 25 is independent of any reverse movement of knob 67 from the hot position in the manner described, no strain is placed upon the thermostatic strip 12, the spring 31 taking up the torsion resulting from this reverse movement of knob 67. Thus the device is fool-proof and not liable to damage through operating abuse. Furthermore, any rapid or back-and-forth movement of plate 47 through its maximum angle of approximately sixty degrees, which is limited in both directions by the engagement of pin 63 with the ends of the cover slot 64, does not cause any damage mechanically nor any short-circuiting, because no live wires are employed and the connecting springs 61 and 62 are arranged so that they bear practically the same spaced relation to each other throughout the entire sixty degree range of movement of the plate 47.

The lever 23 for adjusting the thermostatic strip 12 may be moved to the right or left by loosening screw 22 in order to tighten or loosen the spiral of the thermostatic strip 12. This may be done while the device is emplaced upon the oven and without disassembling any part thereof. Such adjustment is particularly adapted and valuable for calibrating the device either by the cold check method or when the oven is hot, which permits calibration of the device to each individual oven and eliminates the careful and expensive calibration of the device at the factory, which calibration may be disturbed in handling or be inaccurate when mounted upon the oven.

It will be seen that the new thermostatic control device of this invention offers many advantages over those in current use. Among these advantages is the ready mounting of the device upon an oven, which merely involves inserting the thermostatic element through the opening 11 in the oven wall, plugging connector plugs 35, 36 and 37 into the respective connector sockets 35', 36' and 37', and inserting two screws through the mounting ears 19, all of which may be done without disturbing calibration or removing any parts. The parts of the device are few in number, need no adjustment, are arranged ruggedly and are not likely to breakage or other damage by abuse during operation of the device. While a preferred embodiment of the invention has been illustrated and described herein, it is to be understood that the invention is not limited thereby, but is susceptible of many changes in form, detail and arrangement within its scope.

I claim:

1. In a thermostatic control device for an electric oven, the combination of a spiral strip thermostat exposed to the heat of the oven, a frame mounted on the oven, a movable bearing mounted upon said frame carrying one end of said strip, a lever mounted upon the bearing for adjusting the same, means securing said lever to said frame in any adjusted position, a rod journalled in said bearing carrying the opposite end of said strip, a lever carried by said rod and driven thereby, a manually movable member, a contact carried thereby, a movable contact adapted to cooperate with said first contact, resilient means normally urging said contacts into engagement, and controlling connections between said lever and said movable contact for disengaging said contacts.

2. In a thermostatic switch a casing, a thermostat comprising a coiled thermostatic element and a rod connected together at one end, the opposite end of said thermostatic element being mounted rotatably on said casing, means for rotating the end of the thermostatic element relative to the casing to adjust it, means for fastening the end of the thermostatic element against rotation, and a switch operated by said thermostat comprising a pair of fixed contacts, a movable contact movable between said fixed contacts but tending to engage one of said fixed contacts, a pivotally mounted lever tending to swing against said movable contact to move it toward the other of said fixed contacts and an arm operatively connected to said thermostat and movable against said lever to move it away from said contact.

3. In a thermostatic switch, a thermostat and a switch operated by said thermostat comprising a pair of fixed contacts, a movable contact movable between said fixed contacts but tending to engage one of said fixed contacts, a pivotally mounted lever tending to swing against said movable contact to move it toward the other of said fixed contacts and an arm operatively connected to said thermostat and movable against said lever to move it away from said movable contact.

EDWARD L. FONSECA.